US010323593B2

(12) United States Patent
Ball et al.

(10) Patent No.: US 10,323,593 B2
(45) Date of Patent: Jun. 18, 2019

(54) EXHAUST AFTERTREATMENT SYSTEM

(71) Applicant: UMICORE AG & CO. KG, Hanau-Wolfgang (DE)

(72) Inventors: Douglas Ball, Linden, MI (US); David Moser, Sterling Heights, MI (US); John Nunan, Tulsa, OK (US)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/026,036

(22) PCT Filed: Sep. 18, 2014

(86) PCT No.: PCT/EP2014/069924
§ 371 (c)(1),
(2) Date: Mar. 30, 2016

(87) PCT Pub. No.: WO2015/049110
PCT Pub. Date: Apr. 9, 2015

(65) Prior Publication Data
US 2016/0245207 A1    Aug. 25, 2016

Related U.S. Application Data

(60) Provisional application No. 61/886,425, filed on Oct. 3, 2013.

(51) Int. Cl.
*F01N 3/00* (2006.01)
*F02D 41/12* (2006.01)
(Continued)

(52) U.S. Cl.
CPC ......... *F02D 41/126* (2013.01); *F01N 3/0835* (2013.01); *F01N 3/101* (2013.01);
(Continued)

(58) Field of Classification Search
CPC ...... F01N 13/009; F01N 3/101; F01N 3/2066; F02D 41/0275; Y02T 10/24; Y02T 10/22
(Continued)

(56) References Cited

U.S. PATENT DOCUMENTS 5,108,716 A * 4/1992 Nishizawa ........... B01D 53/945
422/171
6,109,024 A * 8/2000 Kinugasa .............. F01N 3/0842
60/285

(Continued)

FOREIGN PATENT DOCUMENTS

CN  101892892 A  11/2010
CN  102688690 A   9/2012
(Continued)

OTHER PUBLICATIONS

Translation of JP 4595926 B2 to Ito et al. (Year: 2010).*
(Continued)

*Primary Examiner* — Audrey K Bradley
*Assistant Examiner* — Anthony Ayala Delgado
(74) *Attorney, Agent, or Firm* — Smith, Gambrell & Russell, LLP

(57) ABSTRACT

The present invention is concerned with an exhaust treatment system and a process for the abatement of noxious pollutants being emitted from a gasoline vehicle. In particular, the present invention is directed to an exhaust system which comprises one or more three-way catalysts (TWC) in a close-coupled (cc) position and an HC-trap/SCR-device in an underfloor (uf) region of the car.

21 Claims, 4 Drawing Sheets

Figure 1:
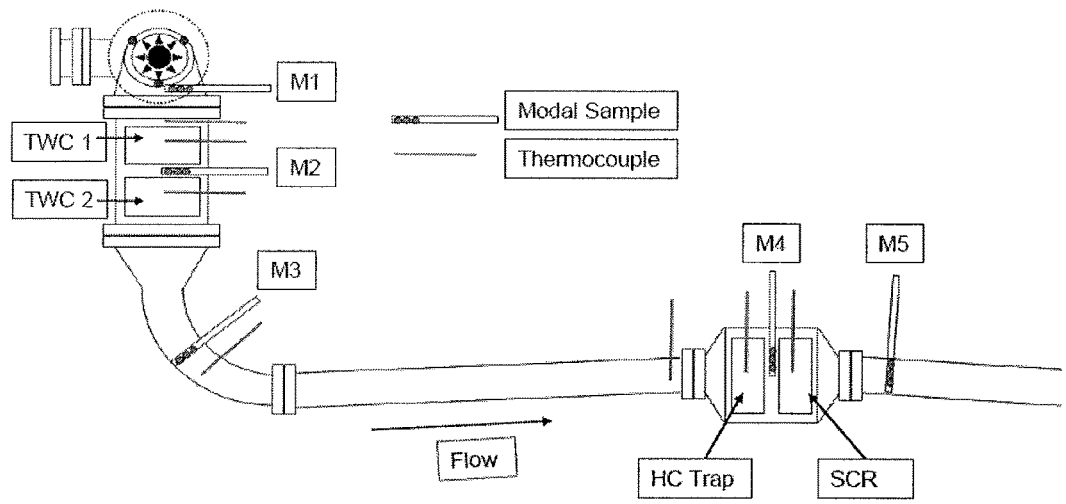

(51) Int. Cl.
*F01N 3/08* (2006.01)
*F01N 3/10* (2006.01)
*F01N 3/20* (2006.01)
*F01N 13/00* (2010.01)
*F02D 41/02* (2006.01)

(52) U.S. Cl.
CPC ......... *F01N 3/2066* (2013.01); *F01N 3/2073* (2013.01); *F01N 13/009* (2014.06); *F01N 13/0093* (2014.06); *F01N 13/0097* (2014.06); *F02D 41/0275* (2013.01); *F02D 41/0235* (2013.01); *Y02A 50/2324* (2018.01); *Y02A 50/2325* (2018.01); *Y02T 10/22* (2013.01); *Y02T 10/24* (2013.01)

(58) Field of Classification Search
USPC .................................................... 60/272–324
See application file for complete search history.

(56) References Cited

U.S. PATENT DOCUMENTS

| | | | | |
|---|---|---|---|---|
| 6,128,899 | A * | 10/2000 | Oono | F01N 3/0842 123/325 |
| 6,729,127 | B2 * | 5/2004 | Woerner | F01N 3/023 60/297 |
| 7,709,414 | B2 * | 5/2010 | Fujdala | B01D 53/945 422/170 |
| 7,841,168 | B2 * | 11/2010 | Oswald | F01N 9/00 60/273 |
| 7,906,449 | B2 * | 3/2011 | Ando | B01D 53/9468 423/213.2 |
| 8,109,081 | B2 | 2/2012 | Perry et al. | |
| 8,173,087 | B2 * | 5/2012 | Wei | B01D 53/9445 423/213.2 |
| 9,156,023 | B2 | 10/2015 | Klingmann et al. | |
| 9,322,351 | B2 * | 4/2016 | Koch | F02D 41/024 |
| 2006/0010857 | A1 | 1/2006 | Hu et al. | |
| 2010/0135879 | A1 | 6/2010 | Roesch et al. | |
| 2012/0004833 | A1 * | 1/2012 | Koch | F02D 41/024 701/104 |
| 2012/0128557 | A1 | 5/2012 | Nunan et al. | |
| 2012/0128558 | A1 | 5/2012 | Nunan et al. | |
| 2012/0210696 | A1 * | 8/2012 | Schmieg | B01D 53/9477 60/274 |
| 2012/0316754 | A1 | 12/2012 | Narayanaswamy et al. | |
| 2013/0243659 | A1 * | 9/2013 | Sutton | B01D 53/944 422/168 |

FOREIGN PATENT DOCUMENTS

| | | |
|---|---|---|
| EP | 0878609 | 3/2002 |
| EP | 1974810 | 8/2010 |
| EP | 1974809 | 9/2010 |
| EP | 2261478 | 12/2010 |
| EP | 1900416 | 4/2011 |
| JP | H07-279651 A | 10/1995 |
| JP | 2002-013429 | 1/2002 |
| JP | 2002-129951 | 5/2002 |
| JP | 2004-008855 A | 1/2004 |
| JP | 4595926 B2 * | 12/2010 |
| KR | 20040042177 | 5/2004 |
| KR | 20130064154 A * | 6/2013 |
| WO | 2004/076829 | 9/2004 |
| WO | 2012/069404 | 5/2012 |
| WO | 2012/069405 | 5/2012 |

OTHER PUBLICATIONS

International Search Report dated Apr. 4, 2015 for PCT/EP2014/069924 (4 pages).
Written Opinion of the International Search Authority dated Apr. 4, 2015 for PCT/EP2014/069924 (7 pages).
(IB/373) International Preliminary Report on Patentability Chapter I dated Apr. 5, 2016 for PCT/EP2014/069924 (4 pages).
Eastwood, Peter. Critical Topics in Exhaust Gas Aftertreatment. Research Studies Press Ltd. 2000. pp. 112-117.
Chinese Office Action dated Feb. 2, 2018 for Chinese Patent Application No. 201480054450.7 (6 pages in Chinese with English translation).
Japanese Office Action dated Jun. 4, 2018 for Japanese Patent Application No. 2016-519975 (4 pages in Japanese with English translation).
Chinese Office Action dated Sep. 26, 2018 for Chinese Patent Application No. 201480054450.7 (7 pages in Chinese with English translation).

* cited by examiner

EXHAUST AFTERTREATMENT SYSTEM

The present invention is concerned with an exhaust treatment system and a process for the abatement of noxious pollutants being emitted from a gasoline vehicle. In particular, the present invention is directed to an exhaust system which comprises one or more three-way catalysts (TWC) in a close-coupled position and an HC-trap/SCR-combination device in an underfloor (uf) region of the car.

Exhaust gases from internal combustion engines operated with a predominantly stoichiometric air/fuel (A/F) mixture, like e.g. port-fuel injection (PFI) engines, are cleaned according to conventional methods with the aid of three-way catalytic (TWC) converters. These are capable of converting the three essentially gaseous pollutants of the engine, specifically hydrocarbons, carbon monoxide, and nitrogen oxides, simultaneously to harmless components.

Optimal use of the TWC is where the air/fuel ratio is around 14.56 equal to a Lambda=1. Around this value shifting A/F from slight lean to slight rich with a certain frequency is termed wobbling (+/−0.05). Above these values, the exhaust gas is said lean, and CO and HC are catalytically oxidized to carbon dioxide and water. Below these values, the exhaust gas is said rich and mainly NOx are reduced to nitrogen $N_2$ using e.g. CO as a reducing agent.

For such gasoline propelled vehicles there is a variety of solutions regarding the exhaust systems applied, i.e. in view of the number of included catalysts and their positions relative to engine outlet. Common single brick solutions in a close-coupled engine out position use different substrates, volumes and precious metal loadings, as well as homogenous or zoned catalyst types. Moreover, the installed catalysts in case of an exhaust system with minimum two bricks or more differentiate e.g. in their individual volume, type of substrate of each brick, precious metal loading and type of coating, like homogenously coated or zoned catalysts (U.S. Ser. No. 12/951,301, now U.S. Pat. No. 8,557,204, incorporated by reference).

A rather common design for stringent emission regulations of large and cooler engines is to have one TWC converter in a rather hot close-coupled (cc) position (close to the engine outlet, inflow appr. up to 50 cm from engine outlet) with the second TWC converter in the cooler underbody (ub or under-floor (uf)) location, meaning being located under the cabin of the car (full TWC system). Since nearly all mobile emission control systems are passive in nature, time to heat up to the catalyst operating temperature is critical as disclosed in EP1900416A, which is relied on and herein incorporated by reference in its entirety.

Vehicles with gasoline direct injected (GDI) engines with and without turbocharger are gaining market share in Europe or the US due to their superior fuel economy and drivability when compared to vehicles with port-fuel injection (PFI) engines. This trend is expected to continue, i.e. due to the mandate of the European Union to passenger car manufacturers to further decrease $CO_2$ emissions and meet a fleet average of 130 g/km $CO_2$. More ambitious $CO_2$ fleet average targets are still under discussion. With CAFE standards becoming more demanding it is generally anticipated that in North America the share of GDI vehicles will grow at the expense of PFI vehicles. The upcoming more stringent governmental emission regulations (e.g. EU-6—table 1, LEV-III) and fuel economy standards ($CO_2$ regulations) will of course make exhaust aftertreatment more difficult in the future.

TABLE 1

Euro 6 emission limits for passenger cars

| | | compression ignition vehicles | spark ignition vehicles |
|---|---|---|---|
| THC | mg/km | n.a. | 100 |
| NMHC | mg/km | n.a. | 68 |
| HC + NOx | mg/km | 170 | n.a. |
| NOx | mg/km | 80 | 60 |
| CO | mg/km | 500 | 1000 |
| particle mass | mg/km | 4.5 | 4.5 |
| particle number | #/km | $6.0 \times 10^{11}$ | TBD |

Hence, also for gasoline vehicles, which predominantly run under stoichiometric conditions (A/F-ratio=14.56 or $\lambda=1$), $CO_2$ emission is becoming a problem and more applications will have to incorporate certain measures in order to improve fuel economy.

Deceleration fuel cut operations (DFCO) is one option to achieve this goal. Surely, these measures will have to find their way into calibrations for respective types of vehicles to improve fuel economy and, hence, further lessen the $CO_2$ emission. Typically, a deceleration fuel cut event starts with stoppage of fuel to the cylinders when power is not required, e.g. during a deceleration period of a vehicle. In this mode the engine operates as an air pump, drawing in ambient air into the cylinders, and expelling it through the exhaust system back to the atmosphere.

As said optimal conversion of HC, CO and NOx over a TWC is achieved at around $\lambda=1$ only. However, gasoline engines operate under oscillating conditions between slightly lean and slightly rich conditions (wobbling). Under purely rich conditions, the conversion of hydrocarbons drops rapidly. Under purely lean conditions NOx breakthroughs are unavoidable. In order to broaden the optimal operation of a TWC, oxygen storage material (OSM) in the form of e.g. Ce-mixed oxides were included in the formulation of the TWC (U.S. Pat. No. 8,557,204; Critical Topics in Exhaust Gas Aftertreatment, Peter Eastwood, Research Studies Press Ltd., 2000). Under fuel cut regime the TWC embracing the OSM is exposed to a net lean environment (excess oxygen). Hence, during this process, the catalyst OSM transitions into either a partially or fully oxidized state, depending on the state of the catalyst at the start of the fuel cut, as well as the duration of the fuel cut. As soon as the ECU has an engine torque request (ie. throttle input), the fuel injection resumes.

When power is required again excess fuel is briefly used to regenerate the three-way catalyst OSM-function. Rich regeneration after a fuel cut is required in order to return the catalyst OSM back to a more reduced state. This is necessary for the ensuing acceleration, when engine flow and NOx concentration rises. If the catalyst system were left in an oxidized state after the fuel cut, a lean engine lambda excursion on the next acceleration would potentially result in a NOx breakthrough to the tailpipe.

Normally, the engine will run rich in the range of 0.8-0.9 lambda during a rich regeneration. This will occur immediately when the fuel injection is turned back on at the end of a fuel cut, when vehicle speed is near zero and flow through the engine is low. The rich operation typically continues into the idle portion when the vehicle stops. Most calibrations use the switching $O_2$ sensor signal behind the catalyst (look for a crossover of 450 mV in the positive direction) as the means for determining when the fuel system can return to a closed loop $\lambda=1$ (±0.005) state of operation.

Therefore, when applying mentioned deceleration fuel cuts with subsequent rich regeneration the problem occurs that the window for optimal emission conversion ($\lambda=1\pm0.005$) is left. Hence, these deceleration fuel cut calibrations must be done carefully, i.e. in order not to increase NOx or HC emissions. Further, drawbacks to improper executed DFCO are that the driver will experience an engine braking effect. Since negative work is being done by the engine during a DFCO, the process acts to slow down the vehicle at a higher rate compared with the scenario where the fuel injection is left on during a deceleration. This is something some drivers may not be used to. In addition, due to rich regeneration meeting HC emission standards will be more difficult as manufacturers downsize engines and use turbochargers to improve fuel economy. These turbochargers significantly lower exhaust temperatures making HC emission reduction very difficult for the most stringent standards (e.g. SULEV, EU-6+).

In order to overcome the envisaged problems the present invention is concerned with an exhaust treatment system for mitigation of noxious pollutants emitted from an engine which is run predominantly under stoichiometric conditions, wherein one or more three-way catalysts in close-coupled (cc) position are accompanied in fluid communication downstream by a combined under-floor (uf) catalyzed HC-trap/SCR-catalyst device. It is this system layout which serves for a favorable mitigation of all pollutants (FIG. 1; FIG. 2) of a gasoline engine operated predominantly at or around $\lambda=1$, in particular in view of the fact that deceleration fuel cuts with subsequent rich purges are yielding a net increase in fuel economy thus leading to a decrease in $CO_2$ emission, no negative impact on the overall emission of noxious gases is encountered.

The cc-TWC is needed—of course—for normal stoichiometric operation of the gasoline engine. One function of the downstream catalyzed HC-trap is to adsorb hydrocarbons during the vehicle cold start and at higher temperatures oxidize the species on the HC-trap catalyst before they desorb, preferably during deceleration fuel cut events. The function of the SCR-catalyst is to reduce NOx emissions during deceleration fuel cuts by reacting ammonia and NOx (both produced by the upstream TWC) to produce nitrogen.

The upstream cc-TWC produces ammonia and NOx simultaneously. During the DFCO—as already explained—OSM in the cc-TWC is put into an oxidized state. Therefore, when the rich regeneration after DCFO takes place, the entrance of the cc-TWC is quickly put in a reduced state and begins to produce ammonia. The outlet of the cc-TWC still being in oxidized state outputs a small amount of NOx initially, through the ammonia oxidation reaction, but is subsequently put into a reduced state also and primarily produces ammonia during the remainder of the rich regeneration period. NOx is no longer produced by cc-TWC once the stored $O_2$ is depleted, which happens depending on the amount of OSM installed or the length of the cc-TWC. Even if 2 cc-TWCs are present NOx production continues as long as the OSM in the second brick is fully reduced. In this regard, the continuation of the ammonia input into the second cc-TWC, during the rich regeneration, acts to combine with the higher level of stored $O_2$ in the second cc-TWC to further increase NOx via the $NH_3$-oxidation reaction. However, not all of the ammonia is consumed during this process, resulting in the under-floor (uf) catalyzed HC-trap/SCR-catalyst device being exposed to ammonia, as well.

In a preferred aspect of the present invention an exhaust system is envisaged wherein the catalyzed HC-trap is located upstream of the SCR-catalyst. Although the results of the present invention are also obtained when the catalyzed HC-trap is located downstream the SCR-catalyst in the under-floor region of the car a slightly better performance can be seen when the catalyzed HC-trap is placed in front of the SCR-catalyst (FIG. 2).

The application of the catalyzed HC-trap relative to the SCR-catalyst is up to the knowledge of the skilled worker. Both functions can be located on one brick in a zoned or layered format but might as well reside on two different bricks which may be spaced away by not more than 60 cm, preferred 15 cm and more preferred 20 cm in the under-floor region of the exhaust train. Advantageously, both functionalities are located on two adjacent bricks in a common housing being in fluid communication with the upstream cc-TWC.

In order to get a good performance the exhaust system in question, when applied to gasoline vehicles running predominantly under stoichiometric conditions with deceleration fuel cut and subsequent rich regeneration periods, comprises an SCR-catalyst which should be able to store at least 0.25 g/L, preferably more than 0.50 g/L and most preferred more than 1.0 g/L ammonia (relative to catalyst volume). As already indicated during rich regeneration after a deceleration fuel cut event the cc-TWC produces some ammonia which can be stored in the downstream SCR-catalyst in order to reduce NOx produced during fuel cut events under lean conditions or by oxidation of ammonia. For high ammonia storage and optimal selective catalytic reduction of NOx zeolytic materials ion-exchanged with metals selected from the group consisting of iron, copper and mixtures thereof can be installed.

In a next preferred aspect the HC-trap installed with the SCR-catalyst in the under-floor region comprises zeolytic materials having an HC-storage capacity of at least 20 mg/L, more preferred more than 30 mg/L and most preferred more than 40 mg/L of catalyst volume. In addition, the HC-trap advantageously comprises a catalyst, e.g. a TWC-type catalyst comprising oxygen storage materials with combinations of PGM selected from the group consisting of platinum, palladium, rhodium and mixtures thereof. The total PGM level of the HC-trap lies preferably between 7 g/L and 0.4 g/L, more preferably between 4-0.4 g/L and most preferably between 1.0-0.4 g/L catalyst volume.

The cc-TWC can be chosen according to the knowledge of the skilled worker. In fact, the cc-TWC may consist of one or more bricks having TWC functionality. Preferred alternatives for cc-TWCs can be found in the subsequent paragraphs. In a very preferred embodiment of the present invention an exhaust system is equipped with 2 closed-coupled three-way catalysts placed adjacent to each other, preferably in one housing.

If 2 or more cc-TWCs are applied they may be equally construed but may also be different in nature. The physical dimensions of the catalysts applied can be same or different and can vary within the limits of 0.5-1.5 L, and most preferred 1-1.5 L. E.g. with regard to the OSM present within the cc-TWCs the skilled worker may apportion the material symmetrically or unsymmetrically over the catalyst. In addition the material used may be same or different. In all aspects this may depend on the engine used.

In a next embodiment the present invention is directed to a process for abatement of noxious pollutants emitted from an engine which is run predominantly under stoichiometric conditions in which an exhaust system as just mentioned is used and a deceleration fuel cut strategy is applied that has a subsequent rich period of engine operation. In this process the exhaust emitted by the engine under operation is conveyed from the engine outlet to the cc-TWC functionality. Under stoichiometric conditions this cc-TWC works as any other known TWC in oxidizing CO, HC and reducing NOx at $\lambda=1$.

A typical deceleration fuel cut event starts with stoppage of fuel to the cylinders when power is not required. The catalysts are exposed to a net lean environment (excess oxygen). When power is required again excess fuel is briefly used to regenerate the three-way catalyst OSM-function of the upstream close-coupled catalyst and catalyst layer of the HC-trap. Within this transition the cc-TWC catalysts may oxidize ammonia increasing NOx emissions as already explained. During this brief period of excess fuel, also ammonia is produced by the cc-TWC catalysts and stored by the SCR-catalyst. The ammonia is produced under rich conditions over the cc-TWC where NOx are not only reduced to $N_2$ but further to $NH_3$. The produced $NH_3$ then flows into the downstream SCR-catalyst and is stored in it. $NH_3$ may be oxidized into NOx across a possible further cc-TWC brick and/or the catalyst layer of the HC-trap. Stored $NH_3$ and $O_2$ on SCR, plus $NH_3$ in the exhaust stream, react according to the paths shown below to reduce the NOx.

The SCR-catalyst will use this stored ammonia during subsequent deceleration fuel cut events to reduce NOx emissions to nitrogen ($N_2$) in a lean environment by reacting ammonia with either NO or $NO_2$. Typical SCR ammonia reactions are:

$$4NH_3+4NO+O_2\rightarrow 4N_2+6H_2O \qquad 1)$$

$$2NH_3+NO+NO_2\rightarrow 2N_2+3H_2O \qquad 2)$$

The SCR-catalyst will reduce NOx emissions during these lean events. For low emission vehicles typical engine closed loop A/F control should be stoichiometric with a slight rich bias lambda near 0.995 (±0.05). The SCR catalyst can also reduce NOx emission during stoichiometric operation or slightly rich bias by reacting ammonia produced by the upstream TWC catalysts to produce nitrogen. See reactions above.

A process is preferred where at least once during rather cold exhaust conditions in the under-floor position of 100-300° C., preferably 100-250° C. and most preferably 100-200° C. a deceleration fuel cut is applied with subsequent rich regeneration. Deceleration fuel cuts, in particular during the early stages of driving, promote the catalytic performance of the HC-trap due to providing oxygen rich exhaust. Not only to load the downstream SCR-catalyst with $NH_3$ rather early during the driving but also this helps to oxidize HCs stored in the catalyzed HC-trap under cold start conditions during the lean fuel cut phase. Hence, the early deceleration fuel cuts do enhance the performance of the catalyzed HC-trap. The excess oxygen during the deceleration fuel cuts promotes the oxidation of adsorbed HCs on the catalyzed HC-trap before they desorb. Hence, a further preferred version of the present invention is directed to the fact that the engine control system goes into closed loop control with deceleration fuel cuts present during cold start of the vehicle, meaning that deceleration fuel cuts should exist e.g. in cycles 1 and 2 of the FTP, when the engine and converters are still warming up.

Fuel cuts should be followed by a rich phase during idle of $\lambda=0.80$-$0.95$ preferably 0.85-0.90 is applied for a short period, e.g. 3-6, preferably around 4-5 seconds. This will result in adequate $NH_3$ formation across the TWC, which the SCR needs to convert NOx.

Substrates:

Mentioned cc-TWC or the HC-trap- or the SCR-catalyst, respectively, are disposed on a substrate monolith. The substrate may be any of those materials typically used for preparing catalysts, and will preferably comprise a ceramic or metal honeycomb structure. Any suitable substrate may be employed, such as a monolithic substrate of the type having fine, parallel gas flow passages extending there through from an inlet or an outlet face of the substrate, such that passages are open to fluid flow there through (referred to as honeycomb flow through substrates). The passages, which are essentially straight paths from their fluid inlet to their fluid outlet, are defined by walls on which or in which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 400-900 or more gas inlet openings (i.e., cells) per square inch of cross section (62-140 cells/cm$^2$).

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. The substrates useful for the catalyst composite of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium, and/or aluminum, and the total amount of these metals may advantageously comprise at least about 15 wt % of the alloy, e.g., about 10-25 wt % of chromium, about 3-8 wt % of aluminum and up to about 20 wt % of nickel. The alloys may also contain small or trace amounts of one or more other metals such as manganese, copper, vanadium, titanium and the like. The surface of the metal substrates may be oxidized at high temperatures, e.g., about 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate. In alternative embodiments, one or more catalyst compositions may be deposited on an open cell foam substrate. Such substrates are well known in the art, and are typically formed of refractory ceramic or metallic materials.

TWC Washcoat:

According to the present invention the upstream cc-TWC substrate or TWC of the downstream HC-trap is coated with an appropriate washcoat carrying a catalyst comprising three-way functionality. The composites can be readily prepared by processes well known in the prior art. As used herein, the term "washcoat" has its usual meaning in the art of a thin, adherent coating of a catalytic or other material applied to a substrate carrier material, such as a honeycomb-type carrier member, which is sufficiently open to permit the passage there through of the gas stream being treated (flow-through monolith).

In principle, within the limits of the present invention any TWC washcoat may be employed in the treatment system, provided that effective treatment of gasoline engine exhaust gas may be realized at λ=1. Appropriate TWC washcoats in zoned, single layer or multilayer design can be found e.g. in EP1974810B1 PCT/EP2011/070541, EP1974809B1, or PCT/EP2011/070539 (incorporated by reference). For further information see also the literature cited as background art.

In preferred embodiments of the present invention, the TWC washcoat comprises a catalyst composed out of PGM metals on a metal oxide support material, said support material preferably being selected from the group consisting of alumina, zirconia, zirconia-alumina, barium oxide-alumina, lanthana-alumina, lanthana-zirconia-alumina, and mixtures thereof. In particularly preferred embodiments, the metal oxide support material is gamma-alumina. Preferably, the support material is doped with a rare-earth, alkaline earth or refractory metal oxide in an amount preferably ranging from 0.01 to 30 wt.-%, more preferably from 0.05 to 15 wt.-%, even more preferably from 0.1 to 10 wt.-%. In particular, the rare-earth, alkaline earth or refractory metal oxide is preferably selected from the group consisting of ceria, lanthana, praseodymia, neodymia, barium oxide, strontium oxide, zirconia and mixtures thereof, wherein the rare-earth, alkaline earth or refractory metal oxide is preferably lanthana, barium oxide and/or zirconia. According to a particularly preferred embodiment of the present invention, the metal oxide support material is gamma-alumina which is preferably doped with a rare-earth, alkaline earth or refractory metal oxide, more preferably with lanthana, barium oxide and/or zirconia.

In addition to said support material, the TWC washcoat of the present invention preferably comprises an oxygen storage component (OSC). Oxygen storage materials have redox properties and can react with oxidizing components such as oxygen or nitrogen oxides in an oxidizing atmosphere and with reducing components such as hydrogen or carbon monoxide in a reducing atmosphere. These oxygen-storing materials are often doped with noble metals such as Pd, Rh and/or Pt, whereby the storage capacity and storage characteristic can be modified.

Oxygen-storing materials are usually composed of oxides of cerium and are possibly used with other metal oxides as thermally stable mixed phases (for example Ce/Zr mixed oxides), preferably chosen from the group consisting of ceria-zirconia-, ceria-zirconia-lanthana-, ceria-zirconia-neodymia-, ceria-zirconia-praseodymia, ceria-zirconia-yttria-, ceria-zirconia-lantha naneodymia-, ceria-zirconia-lanthana-praseodymia- or ceria-zirconia-lanthana-yttria-mixtures. These are capable of removing oxygen from the exhaust gas under lean conditions and releasing said exhaust gas again under rich exhaust-gas conditions. In this way, it is prevented that, during the brief deviation of the fuel/air ratio from λ=1 into the lean range, the NOx conversion across the TWC decreases and NOx breakthroughs occur. Furthermore, a filled oxygen store prevents the occurrence of HC and CO breakthroughs when the exhaust gas briefly passes into the rich range, since under rich exhaust-gas conditions, the stored oxygen firstly reacts with the excess HC and CO before a breakthrough occurs. In this case, the oxygen store serves as a buffer against fluctuations around λ=1. A half-filled oxygen store has the best performance for intercepting brief deviations from λ=1. To detect the filling level of the oxygen store during operation, use is made of lambda sensors.

TWC materials are employed which comprise platinum group metals, e.g. Pt, Rh and Pd. To incorporate components such as platinum group metals (e.g., palladium, rhodium, platinum, and/or combinations of the same), stabilizers and/or promoters, such components may be incorporated in the slurry as a mixture of water soluble or water-dispersible compounds or complexes. Typically, when PGM components, e.g. Pt, Pd and/or Rh, are included in the washcoat, the component in question is utilized in the form of a compound or complex to achieve dispersion of the component on the metal oxide support.

HC-trap Material:

Further storage materials associated with exhaust-gas aftertreatment systems of the present invention are storage materials for hydrocarbons (HC). Such materials are likewise familiar to a person skilled in the art (KR20040042177). Zeolitic materials are conventionally used for storing hydrocarbons. The hydrocarbons are adsorbed while the exhaust gas is cold (for example during a cold start) and are desorbed and converted when a higher exhaust-gas temperature is reached. The conversion of the hydrocarbons takes place mostly at catalytic centres, such as for example PGM. It is therefore conventional to integrate hydrocarbon-storing materials into three-way catalytic converters in order to store the hydrocarbons when the catalytically active centres are not yet active and to desorb said hydrocarbons when the catalytic centres have reached their light-off temperature. In this case, according to the invention the hydrocarbon store may be integrated into the downstream uf-monolith, together with a catalytic TWC-function.

As storage materials for hydrocarbons, use is made of micro-porous solids, so-called molecular sieves. Use is preferably made of zeolitic materials such as for example mordenite (MOR), Y-zeolites (FAU), ZSM-5 (MFI) and β-zeolites (BEA) or mixtures thereof. These are preferably used in H-form or $NH_4$-form being exchanged with transition metals. As already stated the HC-trap comprises a catalyst having TWC-functionality. Reference is made to above mentioned explanation concerning the TWC washcoat. Preferably metals are applied, such as Pt, Pd, Rh and mixtures thereof in association with materials like mordenite (MOR), Y-zeolites (FAU), ZSM-5 (MFI) and β-zeolites (BEA).

Hence, the catalyzed HC-trap preferably consist of an adsorber material containing zeolitic material with preferably a three-way catalyst layer containing oxygen storage components and PGM, like Pt, Pd and Rh. The HC-trap functions well at low PGM levels, preferably well below those mentioned above for normal TWCs. The HC-trap performs well when deceleration fuel cutoff ("DFCO") events exist early in the operational phase, i.e. at cold start. The HC-trap performs well with a slow catalyst light off condition, meaning that the trap performs well when it resides in an exhaust position that results in a slow temperature ramp rate during light off. The HC-trap will desorb nearly all of the HC when reaching a temperature of appr. 330° C. Fuel cut events with subsequent rich purges are required before the HC-trap reaches 250° C., preferably 200° C. as mentioned earlier.

SCR-converter:

SCR catalytic converters are capable of causing nitrogen oxides to react with ammonia to form nitrogen under lean exhaust-gas conditions. SCR catalytic converters conventionally have a storage function for ammonia and contain zeolitic materials, which may be exchanged with transition metals. An SCR catalytic converter is particularly active when its ammonia store is at least partially filled. In this instant case the ammonia is produced in situ by the cc-TWC in phases of rich exhaust gas. A slippage of ammonia as a result of an excess formation or an ammonia desorption as a result of a rapid temperature increase should as far as possible be prevented, since ammonia has an extremely pungent odour and should not, as a secondary or tertiary emission, pass untreated into the atmosphere.

Materials which have proven to be expedient for use for storing $NH_3$ are known to a person skilled in the art (US2006/0010857; WO2004076829). As storage materials for ammonia, use is made preferably of micro-porous solid materials, so-called molecular sieves. These may be zeolitic materials such as for example mordenite (MOR), Y-zeolites (FAU), ZSM-5 (MFI), ferrierite (FER), chabazite (CHA) and β-zeolites (BEA) and aluminium phosphates (AlPO) and silicone aluminium phosphate (SAPO) or mixtures thereof. These are preferably exchanged with transition metals, particularly preferably with iron, copper, cobalt or silver or manganese and catalyse the SCR reactions of ammonia with nitrogen oxides. Use is particularly preferably made of ZSM-5 (MFI), chabazite (CHA), ferrierite (FER), SAPO-34 and β-zeolites (BEA), which are exchanged with iron and/or copper. Use is very particularly preferably made of SAPO-34, chabazite (CHA) or β-zeolites (BEA) exchanged with iron and/or copper.

The SCR-catalyst works preferably in the presence of ammonia and oxygen and at operating temperatures of 200-500, more preferably within 250-400° C.

Typically, equal volumes of catalyzed HC-trap and SCR-catalysts are used, preferably 0.5 L to 1.0 L of each, depending upon the vehicle application. Larger engine displacements typically require more catalyst volume.

Zeolytic material is a material based upon the structural formalisms of Zeolites or Zeotypes.

Zeolite: Zeolites are microporous crystalline aluminosilicate materials characterized by well-ordered 3-D structures with uniform pore/channel/cage structures of 3 to 10 A (depending on framework type) and the ability to undergo ion exchange to enable the dispersion of catalytically active cations throughout the structure.

Zeotype: Zeotypes are structural isotypes/isomorphs of Zeolites but instead of a framework structure derived of linked Silica and Alumina tetrahedra they are based upon for example: alumina-phosphate (ALPO), silica-alumina-phosphate (SAPO), metal-alumina-phosphate (Me-ALPO) or metal-silica-alumina-phosphate (MeAPSO).

When talking about predominantly stoichiometric condition it is understood that in the majority of operation time the engine is fed with an average A/F-ratio of 14.56. Except for at least the purpose of wobbling or the deceleration fuel cuts and rich regeneration the A/F-value stays at λ=1 (±0.005). This holds true regardless which engine type, e.g. PFI or GDI, is used. Such processes are widely known to the skilled worker.

When talking about close-coupled position the skilled worker knows that this means a position which is located in fluid communication with and shortly downstream the engine outlet, preferably within 50 cm, more preferred within 30 cm and most preferred within 20 cm after the engine outlet. The under-floor region is seen as a location below the vehicle cabin. There should be a distance between the cc-TWC and the uf-device, which is in fluid communication with the cc-TWC, of between 50 cm-150 cm, preferably 75-150 and most preferably 100-150 cm.

This invention proposes using a combination of catalyzed HC-trap+SCR-catalysts in the vehicle under-floor position with an upstream close-coupled three-way catalyst (TWC). This combination of HC-trap+SCR-catalyst (typically used in diesel applications) works ideally with deceleration fuel cut strategies that have a subsequent rich period of engine operation. This proposed invention can significantly reduce HC and NOx emissions and enable increase usage of deceleration fuel cuts to improved fuel economy and reduce $CO_2$ emissions.

EXAMPLES AND FIGURES

Figure 2:
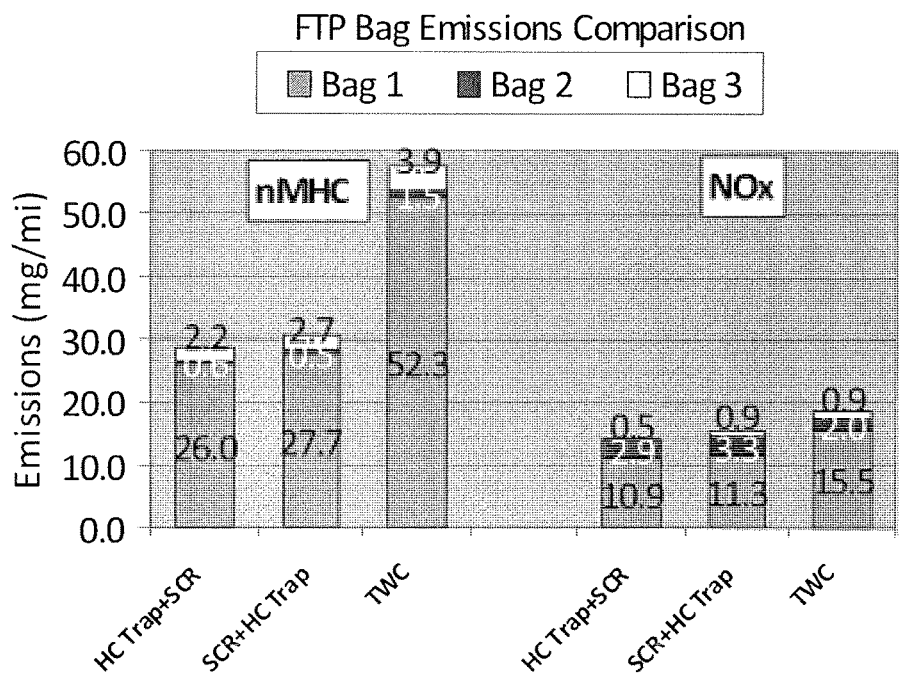

FIG. 1 shows a system layout according to the invention. In an exhaust train in close coupled position two three-way catalysts (TWC1 and TWC2) are located. In the under-floor region downstream of and in fluid communication with the TWCs an HC-trap and a SCR-catalyst are present in one housing. The exhaust flows from the engine through both TWCs and subsequently through the HC-trap/SCR-combination before it is exited to the environment.

1. Example: 2007 Mini Cooper S1.6 L Turbocharged DI

This application contained a dual cc-TWC (CC1 and CC2) with the first brick uf-HC-trap+second brick SCR-catalyst combination as described herein. The CC1 and CC2 catalysts contained 0/2.69/0.14 g/L Pt/Pd/Rh and 0/0.70/0.21 g/L Pt/Pd/Rh, respectively. They were both 0.67 L in volume, making the total CC volume 1.34 L. The uf-HC-trap and SCR were both 0.85 L in size, totaling 1.7 L for the uf and were installed in a common housing. Total system volume was 3.04 L. The HC-trap PGM loading was 0/0.35/0.1 g/L Pt/Pd/Rh. The 2007 Mini Cooper S application has fuel cuts in cycles 1 and 2.

FIG. 2 shows bag emissions for a full TWC system, an uf-HC trap+uf-SCR system, and an uf-SCR+uf-HC-trap system. There is a significant advantage for the uf-HC-trap+uf-SCR system which lowers HC to near half the level present with the TWC system. There is also an advantage for NOx, compared to the full TWC system. The uf-HC-trap+uf-SCR system is slightly better compared to the opposite arrangement of SCR in the front position and HC trap in the rear position.

Figure 3:
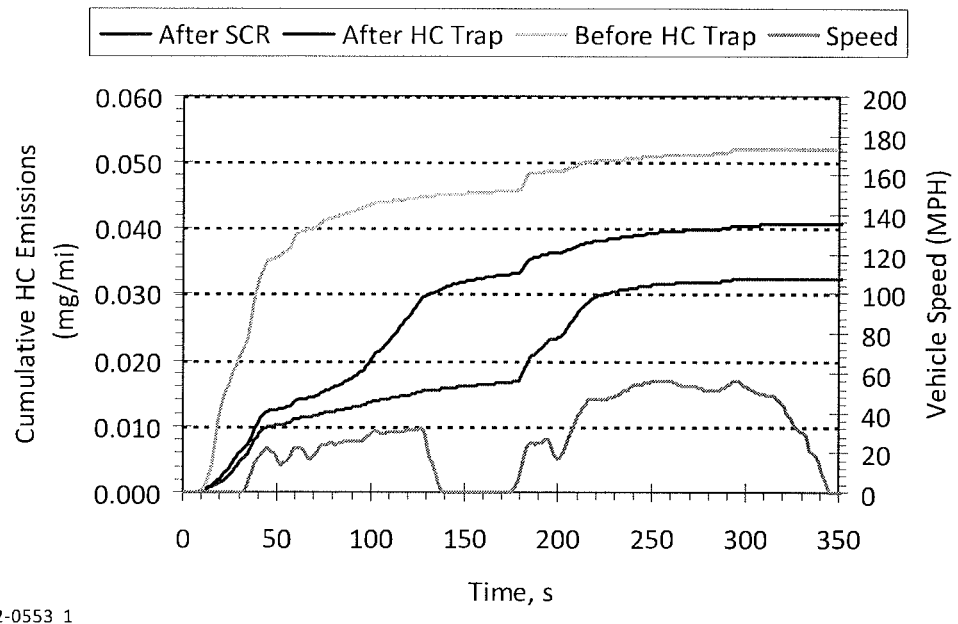

FIG. 3 shows the HC advantage of the uf-HC-trap+SCR combination. The difference between the trap in and tailpipe cumulative emissions represents the contribution of the uf system to HC reduction. In this particular case, HC emissions are reduced from approximately 52 mg/mi to 32 mg/mi, representing a 20 mg/mi benefit. The SCR also helps to reduce HC's, and is responsible for 8 mg/mi of the total 20 mg/mi benefit.

Figure 4:
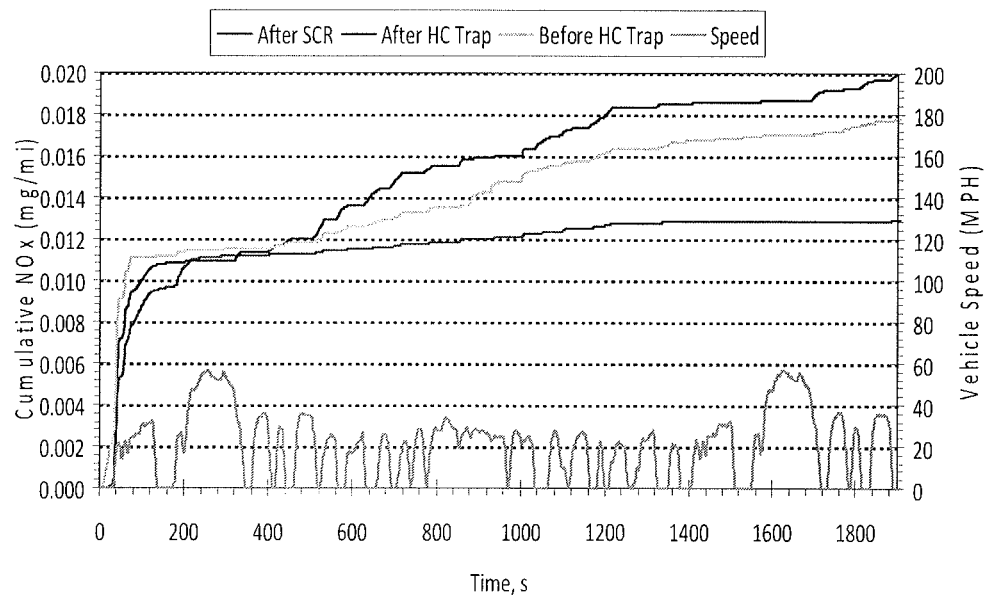

FIG. 4 shows the cumulative emissions data and depicts the NOx mechanism described in this patent. The SCR function is represented by the difference between the SCR inlet emissions and the tailpipe emissions. For this particular test, the SCR reduces NOx from 20 mg/mi to 13 mg/mi, a 7 mg/mi benefit.

Figure 5:
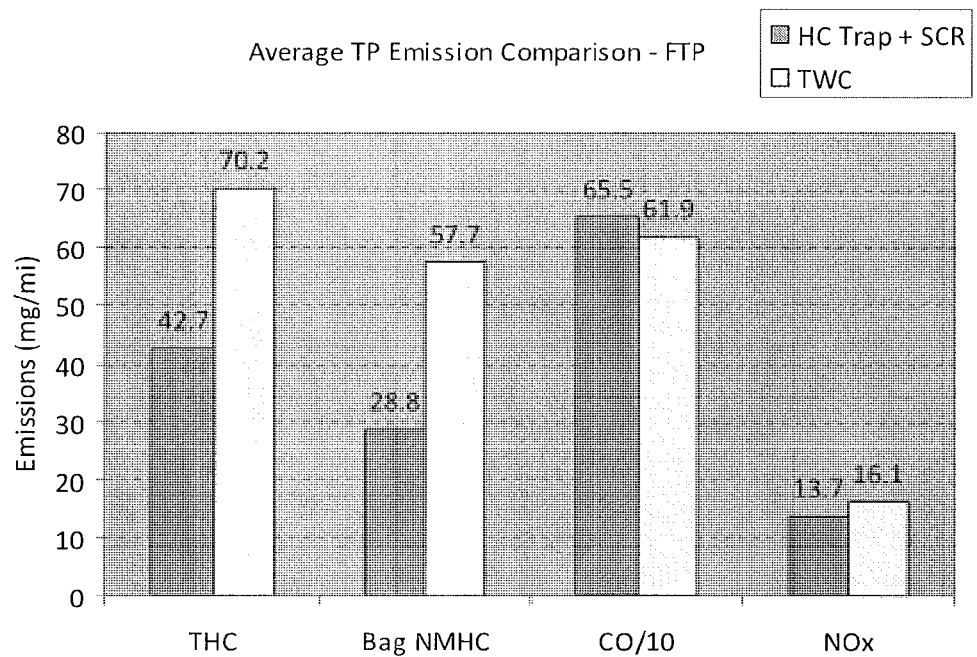

FIG. 5 shows total FTP emissions for the cc-TWC–uf-HC-trap+SCR system vs. a fully formulated double layer TWC at the same level of PGM. The uf-HC-trap+SCR-system has a 27.5 mg/mi advantage for THC, compared to the TWC (TWC in of positions have very little contribution to HC performance, if any), and a 2.7 mg/mi advantage for NOx. On a percentage basis, these advantages are significant!

2. Example: 2013 Dodge Dart 1.4 L Turbocharged PFI

This application contained a single cc-TWC (CC) with the uf-HC-trap+SCR configuration described herein. The cc-catalyst contained 0/6.0/0.3 g/L Pt/Pd/Rh. The CC was 1.4 L in volume. The uf-HC-trap and SCR were both 0.85 L in size, totaling 1.7 L for the UF. Thus, total system volume was 3.1 L The HC-trap PGM loading was 0/0.35/0.1 g/L Pt/Pd/Rh. The 2013 Dodge Dart application has fuel cuts in cycles 1 & 2 of the Federal Test Procedure (FTP)

Figure 6:
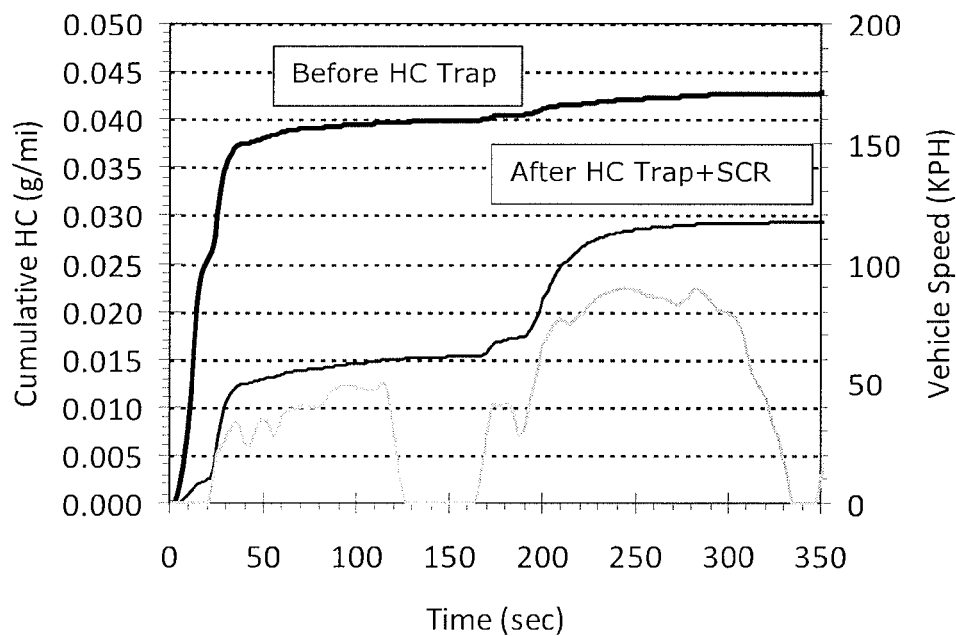

The FIG. 6 shows the THC advantage of the UF-system. The incoming and outgoing THC cumulative emissions at the end of cycle 2 are 43 mg/mi and 29 mg/mi, respectively. This represents a 14 mg/mi benefit for the uf-HC-trap+SCR-system.

Figure 7:
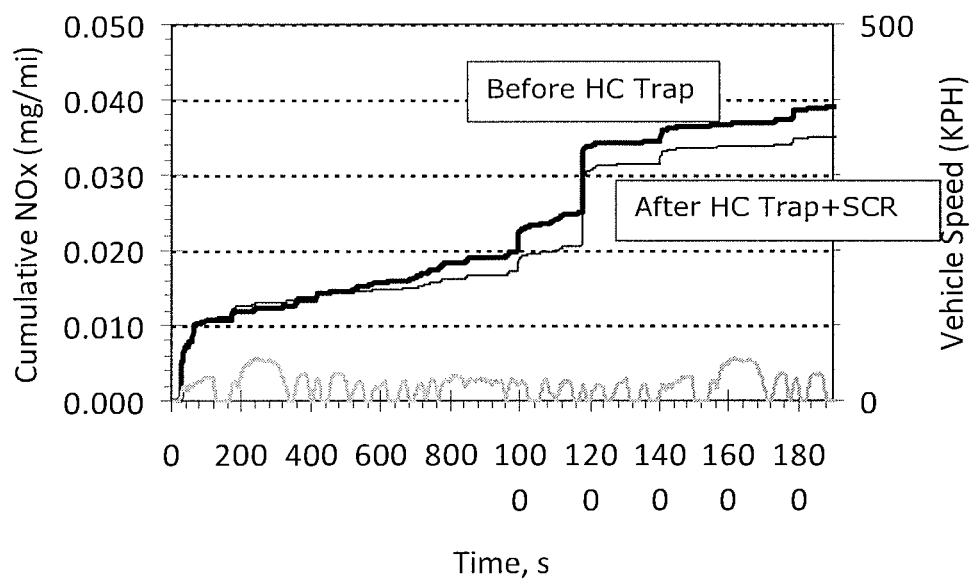

FIG. 7 reflects the SCR function. The SCR reaction is worth approximately 5 mg/mi NOx during the FTP. This performance benefit occurs primarily during bag 2 of the FTP.

The invention claimed is:

1. An exhaust treatment system for mitigation of noxious pollutants emitted from an engine which is run predominantly under stoichiometric conditions, said exhaust treatment system comprising:
    one or more three-way catalysts in close-coupled position, and
    a combined under-floor (uf) catalyzed HC-trap/SCR-catalyst system comprising a catalyzed HC-trap and an SCR catalyst, which HC-trap/SCR-catalyst system is positioned downstream, relative to a direction of exhaust flow produced by the predominately stoichiometric running engine, of the one or more three-way catalysts, and
    wherein the catalyzed HC-trap is located upstream of the SCR-catalyst,
    wherein the SCR-catalyst is able to store ammonia to an extent of at least 0.25 g/L catalyst,
    wherein the SCR catalyst receives the output of the HC-trap directly as a next in line catalyst from the HC-trap, and
    wherein the exhaust treatment system is configured as to rely on ammonia generated by the one or more three-way catalysts as a reductant source for the SCR-catalyst and is therefore free of external SCR reductant injection in an exhaust passageway extending between the HC-trap and SCR-catalyst.

2. Exhaust system according to claim 1, wherein the SCR-catalyst comprises zeolytic materials ion-exchanged with metals selected from the group consisting of iron, copper and mixtures thereof.

3. Exhaust system according to claim 2, wherein the catalyst of the HC-trap comprises zeolytic material having an HC-storage capacity of at least 20 g/L catalyst.

4. A process for abatement of noxious pollutants, comprising passing the noxious pollutants to the exhaust system according to claim 1 while the engine is subject to a deceleration fuel cut strategy that has a subsequent rich period of engine operation.

5. Process according to claim 4, wherein the deceleration fuel cut strategy is performed at least once during rather cold exhaust conditions of 100° C.-300° C.

6. Process according to claim 5, wherein in the rich phase a $\lambda=0.80$-$0.95$ is applied.

7. Process according to claim 6, wherein the rich phase lasts for 3-6 sec.

8. Exhaust system according to claim 1, wherein the combined under-floor (uf) catalyzed HC-trap/SCR-catalyst system is in a common housing.

9. Exhaust system according to claim 8, wherein the combined under-floor (uf) catalyzed HC-trap/SCR-catalyst system is on a single brick contained in the common housing.

10. Exhaust system according to claim 1, wherein the combined under-floor (uf) catalyzed HC-trap/SCR-catalyst system is comprised of two bricks with a first of the two bricks being for the HC-trap composition and a second of the two bricks being for the SCR compositions, with the two bricks being spaced apart by 2 to 0 cms.

11. Exhaust system according to claim 1, further comprising an engine controller configured to achieve an exhaust output to the combined under-floor (uf) catalyzed HC-trap/SCR-catalyst system that is based on a majority of the engine operation time being predominately stoichiometric.

12. An exhaust treatment system for mitigation of noxious pollutants emitted from an engine which is run predominantly under stoichiometric conditions, said exhaust treatment system comprising:
    one or more three-way catalysts in close-coupled position, and
    a combined under-floor (uf) catalyzed HC-trap/SCR-catalyst system comprising a catalyzed HC-trap and an SCR catalyst, which HC-trap/SCR-catalyst system is positioned downstream, relative to a direction of exhaust flow produced by the predominately stoichiometric running engine, of the one or more three-way catalysts, and
    wherein the catalyzed HC-trap is located upstream of the SCR-catalyst, and
    wherein the catalyst of the HC-trap comprises zeolytic material having an HC-storage capacity of at least 20 g/L catalyst,
    wherein a most downstream TWC in the exhaust treatment system is received in a housing that is positioned upstream of another housing receiving the HC-trap, and
    wherein the exhaust system is configured such that, in an exhaust passageway extending between the HC-trap and the SCR-catalyst, externally injected ammonia or urea is not provided.

13. Exhaust system according to claim 12, wherein the HC-trap comprises a catalyst comprising oxygen storage materials with combinations of PGM selected from the group consisting of platinum, palladium, rhodium and mixtures thereof.

14. Exhaust system according to claim 13, wherein the PGM level lies between 7 g/L and 0.4 g/L.

15. Exhaust system according to claim 12, wherein the SCR-catalyst is able to store ammonia to an extent of at least 0.25 g/L catalyst.

16. Exhaust system according to claim 12, wherein the combined under-floor (uf) catalyzed HC-trap/SCR-catalyst system is in a common housing.

17. Exhaust system according to claim 16, wherein the combined under-floor (uf) catalyzed HC-trap/SCR-catalyst system is on a single brick contained in the common housing.

18. An exhaust treatment system for mitigation of noxious pollutants emitted from an engine which is run predominantly under stoichiometric conditions, said exhaust treatment system comprising:
    one or more three-way catalysts in close-coupled position, and
    a combined under-floor (uf) catalyzed HC-trap/SCR-catalyst system comprising a catalyzed HC-trap and an SCR catalyst, which HC-trap/SCR-catalyst system is positioned downstream, relative to a direction of exhaust flow produced by the predominately stoichiometric running engine, of the one or more three-way catalysts, and
    wherein the catalyzed HC-trap is located upstream of the SCR-catalyst, and
    wherein two three-way catalysts are placed adjacent to each other, and wherein a most downstream TWC in the exhaust treatment system is not downstream of the HC-trap.

19. Exhaust system according to claim 18, wherein the SCR-catalyst is able to store ammonia to an extent of at least 0.25 g/L catalyst.

20. Exhaust system according to claim 18, wherein the combined under-floor (uf) catalyzed HC-trap/SCR-catalyst system is in a common housing.

21. Exhaust system according to claim 20, wherein the combined under-floor (uf) catalyzed HC-trap/SCR-catalyst system is on a single brick contained in the common housing.

\* \* \* \* \*